United States Patent

Greskamp et al.

[15] 3,648,337
[45] Mar. 14, 1972

[54] ENCAPSULATING OF ELECTRONIC COMPONENTS

[72] Inventors: John B. Greskamp; William J. Evans, both of Indianapolis, Ind.

[73] Assignee: P. R. Mallory & Co. Inc., Indianapolis, Ind.

[22] Filed: Aug. 24, 1970

[21] Appl. No.: 66,487

[52] U.S. Cl. .............................. 29/25.42, 317/230, 29/570
[51] Int. Cl. ................................................... H01g 13/00
[58] Field of Search .................... 317/230, 231, 232, 233; 29/25.42, 570

[56] References Cited

UNITED STATES PATENTS

| 2,197,193 | 4/1940 | Pontis | 317/230 |
|---|---|---|---|
| 2,628,271 | 2/1953 | Brafman | 317/230 |
| 3,168,613 | 2/1965 | Palmer | 174/65 |
| 3,224,916 | 12/1965 | Soloff et al. | 156/73 |
| 3,320,807 | 5/1967 | Taylor et al. | 73/322.5 |
| 3,438,824 | 4/1969 | Balamuth | 156/69 |

FOREIGN PATENTS OR APPLICATIONS

| 757,804 | 9/1956 | Great Britain | 317/230 |
| 778,853 | 7/1957 | Great Britain | 317/230 |

Primary Examiner—James D. Kallam
Attorney—Richard H. Childress, Robert F. Meyer and Henry W. Cummings

[57] ABSTRACT

The open ends of thermoplastic containers encapsulating electronic components are closed with a compatible plastic material, the materials being sealed by ultrasonic welding utilizing a specially designed energy director.

7 Claims, 7 Drawing Figures

PATENTED MAR 14 1972 3,648,337
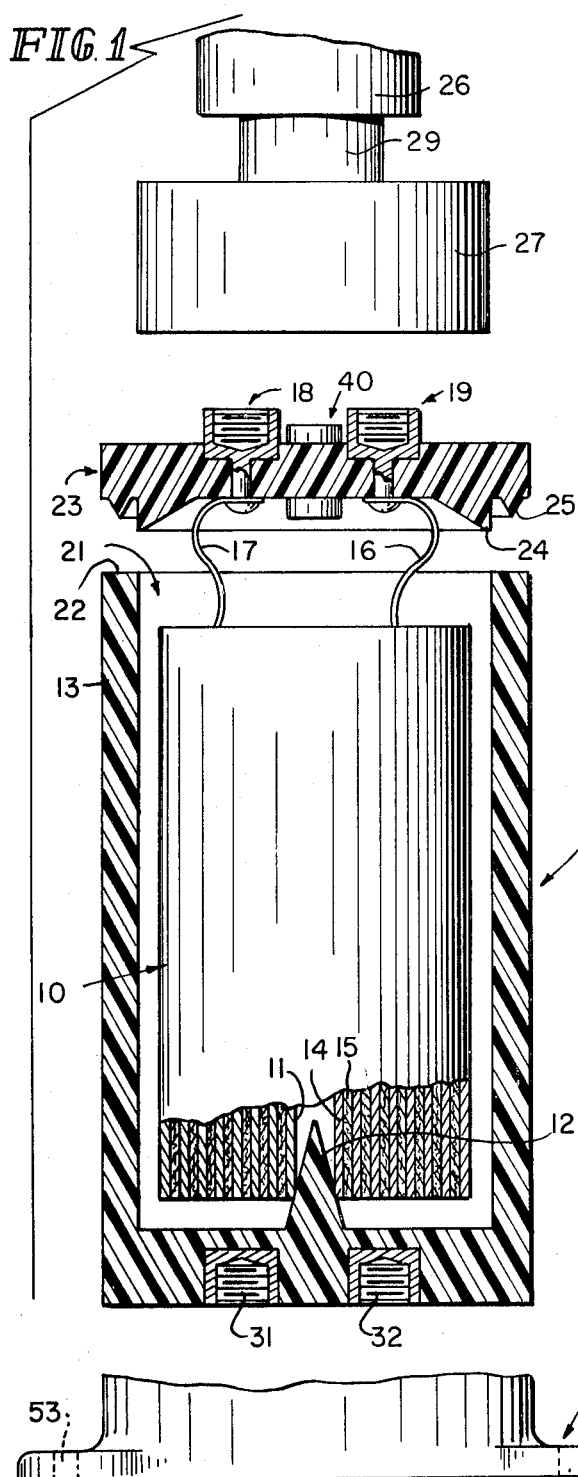
FIG.1
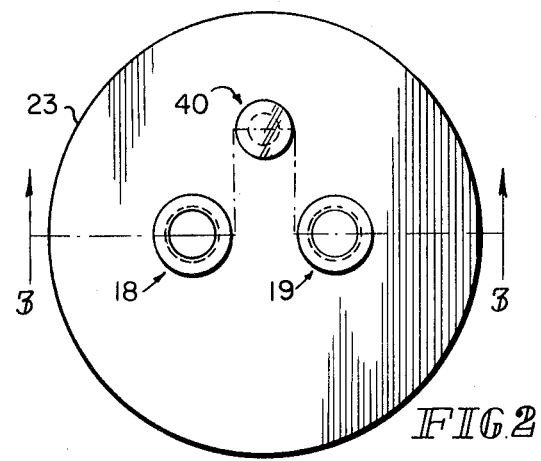
FIG.2
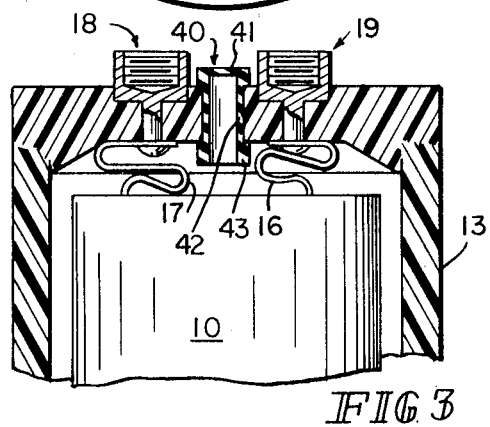
FIG.3
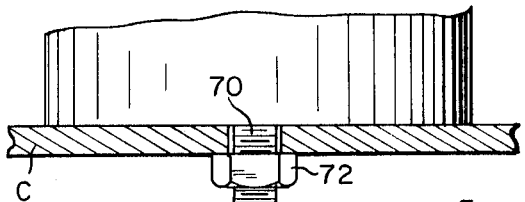
FIG.4
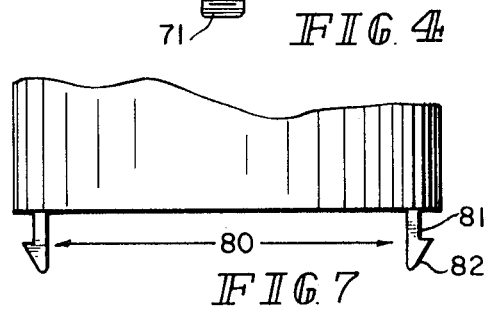
FIG.7
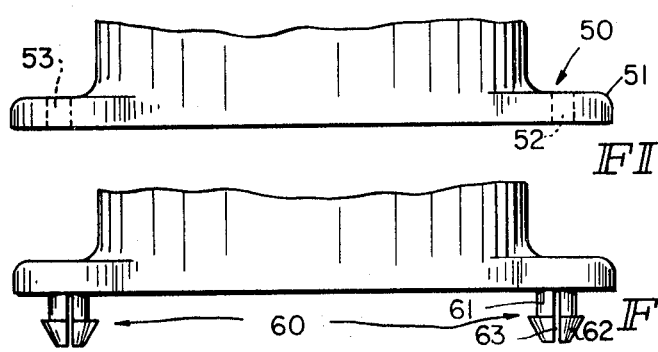
FIG.5
FIG.6
INVENTORS
WILLIAM J. EVANS
JOHN B. GRESKAMP
BY Henry W. Cummings
ATTORNEY

ENCAPSULATING OF ELECTRONIC COMPONENTS

This invention is generally concerned with the encapsulation of electronic components such as batteries, capacitors and semiconductive devices such as diodes, transistors, etc. Therefore, although the invention will be described with particular reference to capacitors, it should be understood that the invention is not so limited.

Prior experience in the capacitor art has clearly established the need for providing efficient protective sealing of capacitor units. Among the important considerations giving rise to this need are the following: resistance to moisture, resistance to chemical attack, resistance to vapors, resistance to heat distortion, mechanical rigidity, containment of the electrolyte, and preservation of electrical properties.

According to previous techniques, the body of a capacitor was encapsulated in a metallic or plastic can wherein the open end was closed by a combination top compressively retained in the open end by a suitable resilient ringlike material. The combination top was generally made of two layers pressed together. The layer of the combination top abutting the can was typically fabricated from an easily compressing material such as rubber. The other or outer layer of the combination top was typically made of some rigid insulating material such as a phenolic or the like. The rubber was generally used to compressively yield under the compressing forces exerted by the resilient ring, thereby forming an acceptable end seal.

It is seen that the housing of the capacitor was therefore composed of three separate and distinct parts, that is, the metallic or plastic can, the combination top of the resilient end which necessitates using several different types of materials and several separate and distinct handling steps thereby increasing the manufacturing costs of the capacitor.

In addition, if the ring is not seated properly, if the combination top is not seated properly, or if the components of the combination top are not mated properly, the end seal would not be effective for sealing the capacitor.

In application Ser. Nos. 659,507, filed Aug. 9, 1969 and 852,139, filed July 2, 1969, now both abandoned, assigned to the same assignee as the present application, a technique is described in which portions of a plastic electronic component case are bonded together with ultrasonic energy by means of a tongue-and-groove joint. However, the tongue-and-groove joint does not result in satisfactory bonds with high reliability for all purposes because the area of contact in the tongue-and-groove joint is somewhat too large for some applications.

It is also desirable to eliminate the need for expensive hardware that is normally necessary to retain a capacitor in an electronic device. It is often desirable that the mounting devices can also be used as terminals.

The present invention is concerned with sealing the open ends of electronic component containers and has as one of its objects a method of closing the open end of such a container using a single plastic material.

Another object of the invention is the provision of a method of closing the open end of a plastic container with a single plastic material utilizing ultrasonic welding.

Another object of the invention is to provide a method of closing the open ends of a container for electronic components wherein thermoplastic materials placed in interlocking relationship are welded together through the heat generated by the vibrations emitted by an ultrasonic device.

Still another object of the invention is to provide a method of heat sealing the materials at the joint formed by the interlocking relationship of the materials.

Another object of the invention is to provide a method of closing the ends of capacitor containers which is simple and economical.

Still another object of the invention is to provide a method of ultrasonically welding an end closure to a capacitor container to provide an excellent mechanical bond.

Another object of the invention is to provide retaining or mounting devices as a part of the molded case.

With the above and other objects in view, which will appear as the description proceeds, this invention resides in a method of closing and sealing capacitor containers substantially as described herein and more particularly defined by the appended claims, it being understood that such changes in the precise embodiment of the invention here disclosed may be made as come within the scope of the claims.

In the drawings:

FIG. 1 is a vertical elevation in partial cross section showing the relationship of a typical capacitor and an ultrasonic welding head used in carrying out the method of the invention.

FIG. 2 is a top view of the capacitor of the present invention.

FIG. 3 is a sectional view along the lines 3—3 of FIG. 2.

FIG. 4 through 7 are side views illustrating various mounting means for mounting the capacitor of the present invention in a container and/or chassis.

Generally speaking, the objects of the invention are accomplished by providing an open-ended thermoplastic sleeve inserting a formed electronic component into the sleeve, placing an end closure of a material compatible to the material of the sleeve over the open end of the sleeve, the end closure being held in interlocking relationship with the sleeve, and ultrasonically welding the sleeve and the end closure together at the interlocking joint to form a container of a single unitary construction to encapsulate the electronic component.

Referring now to the drawings, and especially to FIG. 1, an electronic component such as a convolutely wound capacitor body 10, is substantially cylindrical in shape, with a portion of its center 11 being removed for insertion over the pointed element 12 which extends from the bottom portion of encapsulating container 28. Container 28 is fabricated in two sections, an open ended sleeve 13 and end closure means 25. The illustrated example shown herein is an aluminum foil sheet 14 interwound with an absorbent material 15 such as paper, and impregnated with a liquid electrolyte such as a compounded mixture consisting principally of ethylene glycol and boric acid, although not limited to such. Terminal wires 16 and 17 extend from the body 10 and are electrically connected to electrical terminals 18 and 19 through some suitable means such as rivets or welding. Capacitor sleeve 13 has an open end 21 formed by rim portion 22. The top 23 has several unique features, a shoulder 24 which locates the top on the case by engagement with the internal surface of sleeve 13. This avoids movement of top 23 during application of vibrational bonding energy. A V-type energy director 25 is provided to translate the vibrational energy to case 13 to effect heating of top 23 and sleeve 13. The energy director insures that heating sufficient to cause melting is achieved only at the specific areas to be bonded.

The formed capacitor body 10 with the end closure means and the terminal wires connected to it is first inserted into the sleeve 13. An ultrasonic welding head 26 having a suitably shaped horn 27 is brought into working relationship with the end closure such that the energy director can be welded to form a single unitarily constructed container for encapsulating the capacitor body. Horn 27, which as previously stated, may be of any suitable shape, is connected to welding head 26 through shaft extension 29.

Welding head 26 is, in practice, a sonic converter for converting the alternating current from a power supply (not shown) into mechanical vibrations at the same frequency. Such frequencies are usually in the ultrasonic range of more than 20,000 vibrations per second. Preferably horn 27 needs to be of a suitable shape such that it can be placed against the closure 25 to more readily transmit mechanical vibrations through the closure and to maintain pressure against the closure, thus setting up an ultrasonic wave path which travels radially through the end closure. Any discontinuity in the ultrasonic wave path produces dissipation of energy resulting in the release of heat. In the present invention, the discontinuity appears in the joint between the end closure 25 and sleeve 13. Heat is released at the joint, and the closure and the sleeve become integrally bonded under pressure from the horn to form a unitary container 28 to thus encapsulate the capacitor body 10. It is to be understood that the capacitor body with the sleeve 13 would be held in a suitable jig or fixture to enable the bonding to be carried out efficiently.

Generally speaking, sleeve 13 as well as end closure 23 is made of a plastic material which has a low attenuation to sonic propogation in order to insure that the ultrasonic vibrations will be efficiently transmitted through the material. In addition, the materials need to be chosen with due regard to their use in encapsulating the electronic component. For components such as capacitors and batteries, sleeve 13 and the end (top) closure may be fabricated from a thermoplastic material such as polypropylene, polyamide, polystyrene, polycarbonate and polyacetate resins. However, polypropylene resins are preferred for economic reasons and for physical properties desired.

A good integral bond is dependent to a great degree on the design of the joint. In general, it is important to have only a small portion of the joint in contact at one time so that melting takes place rapidly. If too much plastic is in contact at one time, the part itself acts as a heat sink and simply draws heat away from the joint area so that the plastic never reaches its critical melting temperature. The "V" type energy director 25 shown in FIG. 1 is a particularly good joint configuration because of the small surface area of vibrating member in contact with the fixed member. The shoulder 24 shown in FIG. 1 is particularly important because it keeps the top from skidding while the material in the weld zone is plastic.

It is to be emphasized that through the use of energy director 25 the bonding operation may be carried out very rapidly, less than five (5) seconds and often as rapidly as three (3) seconds and faster.

In addition to threaded metal inserts 18 and 19, top 23 also contains a vent 40 for venting the capacitor when high internal pressures build up within the device. The vent 40 comprises a hollow cylindrical portion 42 having an enlarged portion 43 to maintain engagement with the bottom of closure 23. However, this shape is merely illustrative and other shapes could be used. For example, cylindrical portion 42 may be tapered. Membrane 41 has a thickness such that for the particular material utilized, when the pressure within the device reaches a predetermined value, the device will burst. The vent may be made of a wide variety of elastomeric materials. As examples of the materials which may be used for the vent are copolymers of butyl rubber grafted to styrene (Kraton Shell Oil Co.), butyl rubber grafted to high-density polyethylene (Allied Chemical 11HD).

Another important aspect of the present invention is the provision of means for mounting the device in a container and/or chassis. One such means is to provide threaded openings in the case, preferably in the lower portion thereof. One or more of such threaded openings may be molded directly into the case, or one or more may be provided in the form of metallic threaded inserts, two of which are shown in FIG. 1 at 31 and 32.

Alternatively, the means for mounting may comprise a molded flange 50 which flange comprises a part of the mounting means. For example as shown in FIG. 5 one or more openings such as 52 and 53 may be provided to utilize a nut-and-bolt connection. Another example is shown in FIG. 6, members 60 are forced into appropriately placed openings in the chassis. Opening 63 allows contraction for this purpose. Then enlarged portions 62 hold the device in place on the container and/or chassis.

In still another type of construction a threaded projection 70 may be provided, either as an insert, for example of metal, or the projection with threads 71 thereon may be molded into the plastic case, and a nut 72 utilized to hold the device in engagement with chassis C. In one additional example fingers 80 may be molded having thin portions 81 and enlarged portion 82 which fit into the container and/or chassis to hold the device in place.

What is claimed is:

1. A method of encapsulating a preformed electronic component body which comprises preforming an open-end thermoplastic container member substantially equivalent in shape to the electronic component to be encased, placing said preformed body into said container member, providing a thermoplastic end closure member, at least one of said members having at least one energy director thereon positioned for engagement with the other member; placing said end closure member over said open end to with said energy director engaging the other of said members for closing said container member, applying an ultrasonic vibration to one of said members to set up an ultrasonic wave path traveling through at least a portion of said members and through said energy director to release heat at the joint between said end closure member and said container member whereby said end closure member and said container member integrally bond together to form a single unitary container encapsulating said component body.

2. A method of encapsulating a preformed electronic component body according to claim 1 wherein said container member and end closure member are fabricated from thermoplastic material taken from the class consisting of polypropylene, polyamide, polystyrene, polycarbonate and polyacetate resins.

3. A method according to claim 1 in which said end closure member comprises means for aiding the placement of said end closure member into engagement with the open end of said container member during bonding.

4. In a method for encapsulating a capacitor body having a foil sheet interwound with an absorbent material forming a convolutely wound capacitor body, said body being impregnated with a liquid electrolyte and terminal wires extending from said body, an encapsulating container substantially equivalent in shape to said body and electrical terminals electrically connected to said terminal wires, said container being fabricated of thermoplastic material in two sections; the improvement comprising: providing at least one energy director on one of said sections and mating said sections together to form said container, applying an ultrasonic vibration to the one of said sections having an energy directory for setting up an ultrasonic wave path travelling through said section into said energy director to release heat at the joint formed by mating said sections together, whereby said sections are integrally bonded together into a single unitary container encapsulating said body.

5. In a method of encapsulating a capacitor body according to claim 4 wherein said sections are fabricated of thermoplastic material taken from the class consisting of polypropylene, polyamide, polystyrene, polycarbonate, and polyacetate resins.

6. In a method of encapsulating a capacitor body according to claim 4 wherein one of said sections comprises a container to aid engagement of said sections preceding and during bonding.

7. A method according to claim 6 in which one of said section comprises means for mounting said unitary container in a chassis.

* * * * *